United States Patent [19]

Dieterich et al.

[11] 4,293,474

[45] Oct. 6, 1981

[54] POLYURETHANE IONOMER DISPERSIONS CONTAINING ELECTROLYTES

[75] Inventors: Dieter Dieterich, Leverkusen, Fed. Rep. of Germany; Peter Markusch, New Martinsville, W. Va.

[73] Assignee: Bayer Aktiengesellschaft, Leverkusen, Fed. Rep. of Germany

[21] Appl. No.: 113,920

[22] Filed: Jan. 21, 1980

Related U.S. Application Data

[63] Continuation of Ser. No. 862,455, Dec. 20, 1977, abandoned.

[30] Foreign Application Priority Data

Dec. 30, 1976 [DE] Fed. Rep. of Germany ....... 2659617

[51] Int. Cl.$^3$ ..................... C08G 18/12; C08G 18/32; C08L 75/08; C08L 75/12
[52] U.S. Cl. ........................... 260/29.2 TN; 260/37 N
[58] Field of Search ................................ 260/29.2 TN

[56] References Cited

U.S. PATENT DOCUMENTS

| | | | |
|---|---|---|---|
| 3,479,310 | 11/1969 | Dieterich et al. | 260/29.2 TN |
| 3,796,678 | 3/1974 | Bartizal | 260/29.2 TN |
| 3,935,146 | 1/1976 | Noll et al. | 260/29.2 TN |
| 3,951,897 | 4/1976 | Matsuda et al. | 260/29.2 TN |
| 3,965,051 | 6/1976 | Markush et al. | 260/29.2 TN |
| 3,993,615 | 11/1976 | Markofsky et al. | 260/29.2 TN |
| 4,028,313 | 6/1977 | Muller et al. | 260/29.2 TN |
| 4,042,536 | 8/1977 | Dieterich et al. | 260/29.2 TN |
| 4,048,001 | 9/1977 | Remley | 260/29.2 TN |
| 4,066,592 | 1/1978 | Wismer et al. | 260/29.2 TN |
| 4,068,035 | 1/1978 | Violland | 260/29.2 TN |

*Primary Examiner*—John C. Bleutge
*Assistant Examiner*—A. H. Koeckert
*Attorney, Agent, or Firm*—Gene Harsh; Joseph C. Gil

[57] ABSTRACT

The instant invention is directed to aqueous dispersions or solutions of polyurethane ionomer characterized by (a) hydrophilic polyalkylene oxide polyether chains in the polyurethane having an ethylene oxide unit content of from 1.2 to 50% by weight based on the polyurethane solid content, (b) a content of from 5 to 250 milliequivalents of ionic groups incorporated in the polyurethane per 100 grams of polyurethane solids content, and (c) from 0.5 to 100% by weight of water soluble electrolytes dissolved in water, based on the polyurethane solids content.

3 Claims, No Drawings

POLYURETHANE IONOMER DISPERSIONS CONTAINING ELECTROLYTES

This is a continuation, of application Ser. No. 862,455 filed Dec. 20, 1977 now abandoned.

BACKGROUND OF THE DISCLOSURE

Aqueous dispersions of polyurethane of polyurethane ureas are known (e.g., as described in e.g. Angewandte Chemie, 82, (1970) pages 53 to 63 and U.S. Pat. Nos. 3,920,598 and 3,905,929). These dispersions are of a high quality.

An important reason for this high quality level is the fact that many of these dispersions are free from emulsifiers. They contain chemically incorporated hydrophilic centers which make the otherwise hydrophobic elastomers self-emulsifiable. This method of making dispersions self-emulsifiable has two major advantages over the use of emulsifiers:

(1) a smaller quantity of hydrophilic centers is required; and
(2) the built-in emulsifier is incapable of migrating from shaped products produced from these elastomer dispersions; such migration normally has a considerable effect on the properties of a product.

The first feature, in particular, considerably reduces the sensitivity to water of shaped products produced from self-emulsified polyurethanes. The hydrophilic centers incorporated into the known polyurethanes or polyurethane ureas which are dispersible in water may be either salt-type groups, i.e. ionic groups, or non-ionic groups.

The first of these two types of polyurethanes, known as, "polyurethane ionomers", include both polyurethanes which have chemically fixed cations, i.e. in particular chemically incorporated ammonium ions, and polyurethanes which have chemically fixed anions, i.e. in particular chemically incorporated sulfonate or carboxylate groups. Among the last mentioned non-ionic polyurethanes which are dispersible in water may be included, in particular, the polyurethanes and polyurethane ureas described in U.S. Pat. Nos. 3,920,598 and 3,905,929 which contain polyethylene oxide side chains.

The dispersions of these polyurethanes have various characteristic properties depending on the nature of the hydrophilic center. Polyurethane ionomer dispersions are stable to elevated temperatures up to their boiling point because the solubility of the salt groups contained in them is virtually independent of the temperature. Non-ionic dispersions coagulate even when heated to moderate temperatures (about 60° C.) because the polyethylene oxide side chains gradually lose their solubility in water at elevated temperatures. However, in contrast to ionomers, these dispersions are stable to the addition of virtually unlimited quantities of electrolytes as well as to freezing and thawing.

Polyurethane dispersions and polyurethane solutions on the basis of ionomers containing significant quantities of water-soluble electrolytes, e.g. more than 0.4 g per 100 g of polyurethane, have not hitherto been known. Indeed, the presence of electrolytes has hiterto been deliberately excluded as far as possible in order not to reduce the stability of the dispersions and solutions. In most ionomer disperisons known in the art, even the addition of a small quantity of aqueous electrolyte solution immediately causes localized coagulation. If such coagulation does not occur instantly, for example if it occurs only after several hours or days, as is the case with dispersions containing sulfonate groups, the dispersions are already considered to have good stability to electrolytes.

The present invention provides new, stable aqueous dispersions or solutions of polyurethane ionomers which contain water-soluble inorganic or organic electrolytes.

DESCRIPTION OF THE INVENTION

It has surprisingly been found that the preparation of such polyurethane ionomer dispersions containing electrolytes can be achieved if both ionic groups and hydrophilic chains which contain ethylene oxide units are incorporated into the polyurethane. This is very surprising in view of the fact that it was found that mixtures of aqueous dispersions of ionic and non-ionic polyurethanes were in no way compatible with electrolytes.

The present invention thus relates to aqueous dispersions or solutions of polyurethane ionomers which are stable at room temperature, characterized by (a) hydrophilic polyalkylene oxide polyether chains in the polyurethane having an ethylene oxide unit content of from 1.2 to 50% by weight, based on the polyurethane solid content, (b) a content of from 5 to 250 milliequivalents of ionic groups incorporated in the polyurethane, per 100 g of polyurethane solids content, and (c) a content of from 0.5 to 100% by weight of water-soluble electrolytes dissolved in water, based on the polyurethane solids content.

The present invention also relates to a process for the preparation of such dispersions or solutions by the reaction of organic diisocyanates with organic compounds which are difunctional in the isocyanate polyaddition reaction and which contain isocyanate reactive hydrogen atoms in end positions, which organic compounds preferably have molecular weights of from 300 to 6000, with the addition of reaction components containing hydrophilic groups or groups capable of conversion into such hydrophilic groups to render the polyurethanes dispersible, at least partial conversion of the last mentioned groups into hydrophilic groups taking place during or after the polyaddition reaction, and optionally in the presence of the usual chain lengthening agents with a molecular weight below 300 which are used in polyurethane chemistry and optionally with the addition of the usual auxiliary agents and additives used in polyurethane chemistry. Solution or dispersion of the polyurethane in water is carried out during or after synthesis of the polyurethane. The process is characterized in that the components for the synthesis which contain hydrophilic groups or groups capable of conversion into hydrophilic groups include both (a) mono-or diisocyanates and/or compounds, which are mono-functional or difunctional in the isocyanate polyaddition reaction and which have isocyanate reactive hydrogen atoms, which mono-and diisocyanates and which compounds carry hydrophilic chains which contain ethylene oxide units in lateral or terminal positions and (b) mono-or diisocyanates and/or compounds which are monofunctional or difunctional in the isocyanate polyaddition reaction, which compounds contain isocyanate reactive hydrogen atoms and where said isocyanates and compounds contain ionic groups or groups which are capable of conversion into ionic groups.

The nature and quantity or degree of neutralization or quaternization of components (a) and (b) is selected so that the polyurethane finally obtained contains from 1.2 to 50% by weight, and preferably from 2 to 20% by weight of incorporated ethylene oxide units and from 5 to 250 milliequivalents of ionic groups per 100 g. From 0.5 to 100% by weight, based on the quantity of dissolved or dispersed polyurethane, of water-soluble electrolytes are added to the aqueous phase during or after solution or dispersion of polyurethane.

Organic diisocyanates suitable for the process according to the invention are represented by the following general formula

in which R represents an organic group such as can be obtained by removal of the isocyanate groups from an organic diisocyanate generally having a molecular weight in the range from 112 to 1000, and preferably from 140 to 400. Particularly suitable diisocyanates for the process according to the invention are those represented by the above general formula in which R represents a divalent aliphatic hydrocarbon group having 4 to 18 carbon atoms, a divalent cycloaliphatic hydrocarbon group having from 5 to 15 carbon atoms, a divalent aromatic hydrocarbon group having from 6 to 15 carbon atoms or a divalent araliphatic hydrocarbon group having from 7 to 15 carbon atoms. Representatives of these organic diisocyanates which are particularly suitable for the process according to the invention include, for example, tetramethylene diisocyanate; hexamethylene diisocyanate; dodecamethylene diisocyanate; cyclohexane-1,3-and-1,4-diisocyanate; 1-isocyanato-3-isocyanatomethyl-3,5,5-trimethylcyclohexane; 4,4'-diisocyanatodicyclohexyl methane; aromatic diisocyanates such as 2,4-diisocyanatotoluene, 2,6-diisocyanatotoluene and mixtures of these isomers; 4,4'-diisocyanatodiphenylmethane, 1,5-diisocyanatonaphthalene, and the like.

The following are specific examples of compounds suitable for the process according to the invention which are difunctional in the isocyanate polyaddition reaction, contain groups which are reactive with isocyanates and have molecular weights within the range of from 300 to 6000, are preferably from 500 to 3000:

(1) dihydroxypolyesters generally known in polyurethane chemistry, obtained from dicarboxylic acids (such as succinic acid, adipic acid, suberic acid, azelaic acid, sebracic acid, phthalic acid, isophthalic acid, terephthalic acid, tetrahydrophthalic acid, and the like) and diols, (e.g. ethylene glycol, propylene-1,2-glycol, propylene-1,3-glycol, diethylene glycol, butane-1,4-diol, hexane-1,6-diol, octane-1,8-diol, neopentyl glycol, 2-methylpropane-1,3-diol the various isomeric bishydroxymethylcyclohexanes, and the like);

(2) polylactones generally known in polyurethane chemistry, for example the polymers of ε-caprolactone started on the above-mentioned dihydric alcohols;

(3) polycarbonates generally known in polyurethane chemistry, such as those obtainable by reaction of the above mentioned diols with diaryl carbonates or phosgene;

(4) polyethers generally known in polyurethane chemistry, such as the polymers or copolymers of styrene, propylene oxide, tetrahydrofuran, butylene oxide or epichlorohydrin which can be obtained with the aid of divalent starter molecules such as water, the above mentioned diols or amines containing two NH bonds; a certain proportion of ethylene oxide may also be used, provided that the polyether used does not contain more than about 10% by weight of ethylene oxide; a general rule, however, polyethers prepared without ethylene oxide are used;

(5) polythioethers, polythio mixed ethers and polythio ether esters generally known in polyurethane chemistry;

(6) polyacetals generally known in polyurethane chemistry, for example those obtained from the above mentioned diols and formaldehyde, and, (7) difunctional esters containing isocyanate reactive end groups as are generally known in the art.

The compounds of the type defined above preferably used for the process according to the invention are dihydroxy polyesters, dihydroxypolylactones, dihydroxypolyethers and dihydroxypolycarbonates.

The compounds according to the invention could, if desired, be prepared without the use of higher molecular weight polyhydroxyl compounds, i.e. exclusively from diisocyanates and low molecular weight reaction components (molecular weight below 300).

Compounds with a molecular weight below 300 which may be used according to the invention include, for example, the low molecular weight diols already described for the preparation of the dihydroxy polyesters, diamines such as diaminoethane, 1,6-diaminohexane, piperazine, 2,5-dimethylpiperazine, 1-amino-3-aminomethyl-3,5,5-trimethylcyclohexane, 4,4'-diaminodicyclohexylmethane, 1,4-diaminocyclohexane and 1,2-propylene diamine or also hydroazine, amino acid anhydrazides, hydrazides of semicarbazidocarboxylic acids, bishydrazides, bissemicarbazides, and the like.

In some cases, where the polyurethanes are required to be branched, trifunctional and higher functional components generally known in polyurethane chemistry may be used in addition to the above mentioned components which are difunctional in the isocyanate polyaddition reaction.

This is particularly advantageous when monofunctional hydrophilic polyethers are used. However, the starting components are preferably chosen so that their average functionality does not exceed 2.1.

The components used in the process according to the invention must include (a) any mono-or diisocyanates and/or compounds which are monofunctional or difunctional in the isocyanate polyaddition reaction, which compounds contain isocyanate reactive hydrogen atoms and where the isocyanates and compounds contain hydrophilic chains containing ethylene oxide units and (b) any mono-or diisocyanates and/or compounds which are monofunctional or difunctional in the isocyanate polyaddition reaction, which compounds contain isocyanate reactive hydrogen atoms, where the isocyanates and compounds contain ionic groups or groups capable of conversion into ionic groups.

The preferred hydrophilic starting components containing hydrophilic chains with ethylene oxide units in side positions include compounds represented by the following formula

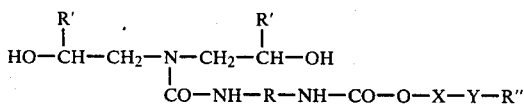

and/or compounds represented by the following formula

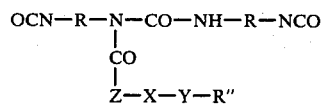

Starting components a) represented by the first mentioned formula (I) are particularly preferred.

In the above formulae (I) and (II),

R represents a divalent group of the type which can be obtained by removal of the isocyanate groups from a diisocyanate of the formula $R(NCO)_2$ as defined above, R' represents hydrogen or a monovalent hydrocarbon group having from 1 to 8 carbon atoms, preferably hydrogen or a methyl group, R" represents a monovalent hydrocarbon group having from 1 to 12 carbon atoms, preferably an unsubstituted alkyl group having from 1 to 4 carbon atoms, X represents the divalent radical obtained by removal of the terminal oxygen atom from a polyalkylene oxide chain having from 5 to 90, preferably 20 to 70 chain members, of which at least 40%, preferably at least 65% consist of ethylene oxide units and which in addition to ethylene oxide units may also contain other alkylene oxide units, such as, propylene oxide, butylene oxide or styrene oxide units, propylene oxide units being preferred among the latter, Y represents oxygen or —NR''', in which R''' has the same definition as R", and Z represents a group having the same definition as Y.

Compounds of the above mentioned formula (I) and (II) may be prepared by the methods described in U.S. Pat. Nos. 3,920,598 and 3,905,929 (the disclosures of which are herein incorporated by reference). In addition to the details given there, it should be stipulated that instead of the mono-functional polyether alcohols mentioned there as starting materials, one may also use starting materials in which the polyether segments, in addition to containing ethylene oxide units, contain up to 60% by weight, based on the polyether segment, of other alkylene oxide units, such as, propylene oxide, butylene oxide or styrene oxide, preferably propylene oxide untis. The presence of such "mixed polyether segments" may provide specific advantages in special cases.

Other particularly preferred hydrophilic starting components for the incorporation of chains containing hydrophilic ethylene oxide units in end positions or side positions are compounds of the formula

HO—X—Y—R"

or, less preferred,

HR"N—X—Y—R", and/or compounds of the formula

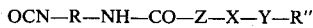

in which

X, Y, Z, R and R" have the meanings defined above.

Starting components (b) which are essential to this invention exclude, in particular, any organic compounds containing isocyanate groups or isocyanate reactive groups and in addition tertiary nitrogen atoms, ammonium groups, carboxyl groups, carboxylate groups, sulfonic acid groups, sulfonate groups, thioether groups, sulfonium groups, phenol groups or phenolate groups. Suitable compounds of this type which contain groups capable of salt formation or salt type groups of the first six types mentioned above include, for example, the compounds mentioned as examples in U.S. Pat. No. 3,479,310 (the disclosure of which is herein incorporated by reference) column 4, line 11 to column 6, line 9 which are monofunctional or difunctional in the isocyanate polyaddition reaction, or the corresponding compounds with salt groups obtainable by simple neutralization or quaternization. Suitable neutralizing or quaternizing agents include, for example, the compounds mentioned in column 6, lines 14 to 39 of the above mentioned U.S. Patent. The starting components (b) also include, for example, diamines and polyamines which, either before or after the reaction with polyisocyanates, give rise to a tertiary amino group suitable for neutralization or alkylation, for example by reaction with an epoxide, or to a carboxylic acid or sulfonic acid group by reaction e.g. with sultones, lactones, unsaturated carboxylic acids or dicarboxylic acid anhydrides (see e.g. U.S. Pat No. 3,461,103). Isocyanatoaryl sulfonic acids and isocyanate prepolymers which have been reacted with sulfonating agents are typical examples of isocyanates having potential ionic groups.

The starting components used for incorporating tertiary sulfonium groups into the polyurethane include, for example, the compounds mentioned in U.S. Pat No. 3,419,533 (the disclosure of which is herein incorporated by reference) column 3, line 75 to column 4, line 51. It is immaterial what method is used for building the cationic center into the polyurethane. Apart from the methods described in the two patents mentioned above, for example, an isocyanate prepolymer of a polyurethane carrying an epoxy group could first be prepared, and the basic center could then be introduced by reacting the epoxy group with a primary or secondary amine, and this basic center could then be converted into the salt form by means of an inorganic or organic acid or an alkylating agent.

Phenolic hydroxyl groups or phenolate groups obtained from them by neutralization could be incorporated, for example, by means of polyhydric phenols such as 1,2-, 1,3- or 1,4-dihydroxybenzene, since the hydroxyl groups of such polyhydric phenols are graded in their reactivity with isocyanate groups. In this way, one hydroxyl group can easily be made to react with the isocyanates to form urethane groups while the second hydroxyl group remains available for the neutralization reaction to form phenolate groups.

The preparation of polyurethanes containing ammonium, carboxylate or sulfonate groups is preferred according to the invention to the preparation of polyurethanes containing sulfonium groups of phenolate groups.

In the process according to the invention, the nature and quantity of component (a) is chosen so that the polyurethanes according to the invention contain from 1.2 to 50% by weight, preferably from 2 to 20% by weight of ethylene oxide units CH$_2$—CH$_2$—O—. The nature and quantity or degree of neutralization or quaternization of component (b) is so chosen in the process according to the invention that the polyurethanes contain from 5 to 250 milliequivalents per 100 g, preferably from 10 to 50 milliequivalents per 100 g, of ionic groups, preferably of =N$^\oplus$=, —S$^\oplus$=, —COO$^\ominus$,

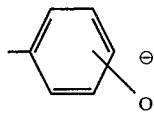

or —SO$_3^\ominus$ groups. The total sum of the number of milliequivalents of ionic groups built in per 100 g of polyurethane plus the number of "pseudomilliequivalents" of built-in ethylene oxide units in terminal and/or lateral positions per 100 g of polyurethane is preferably from 10 to 200, most preferably from 20 to 120.

By "one pseudomilliequivalent" of incorporated ethylene oxide units is meant the quantity of ethylene oxide units built into a polyalkylene oxide chain which makes the same contribution to the dispersibility of the polyurethane in water as 1 milliequivalent of incorporated ionic groups (The effectiveness of the above mentioned ionic groups in contributing to the dispersibility of the polyurethane depends as a first approximation on the number of milliequivalents of ionic groups and not on the nature of the ionic groups). In aqueous polyurethane dispersions, the average particle diameter of the dispersed polyurethane particles depends on the concentration of the built-in hydrophilic centers in the polyurethane. If the structure of a polyurethane is otherwise unchanged, the average particle size generally increases with decreasing concentration of the hydrophilic centers. Detailed studies have shown that in any ionically modified polyurethane which is dispersible in water, assuming that the molecular structure is otherwise completely analogous, the ionic groups can always be replaced by a certain quantity of ethylene oxide units situated in terminal and/or lateral positions within a polyether chain, thereby obtaining a corresponding, exclusively non-ionically modified polyurethane which, when dispersed in water, has the same average particle size (assuming that a similar method of preparation was used for preparing the polyurethane dispersion) if the milliequivalents of ionic groups present in the ionically modified polyurethane are replaced by the same number of "pseudomilliequivalents" of non-ionic groups. Thus, one milliequivalent of built-in ionic groups corresponds to 0.5 g of ethylene oxide units built into terminal and/or lateral positions in a polyether chain. By "pseudomilliequivalent" of non-ionic groups is therefore meant 0.5 g of ethylene oxide units built into terminal and/or lateral positions within a polyether chain. Consequently, an aqueous dispersion of an exclusively ionically modified polyurethane containing, for example, 12 milliequivalents per 100 g of one of the above mentioned ionic groups will have dispersed polyurethane particles of the same average particle diameter as an analogously prepared, exclusively non-ionically modified polyurethane dispersion having an analogous structure and containing 6 g/100 g of ethylene oxide built into a terminal and/or lateral polyether chain.

The process according to the invention may be carried out by known methods of polyurethane chemistry, both by the one-shot process and by the two-stage (prepolymer) process.

When preparing the self-dispersible polyurethanes, the reactants are used in an equivalent ratio of isocyanate groups to isocyanate reactive groups of between 0.8:1 and 2.5:1, preferably between 0.95:1 and 1.5:1. If an isocyanate excess is used, the reaction naturally gives rise to isocyanate containing compounds which, when converted into an aqueous dispersion, continue to react with water by a process of chain lengthening to form the dispersed end product. The equivalent ratio indicated above therefore includes all components taking part in the synthesis of the polyurethanes according to the invention, including the chain lengthening agents containing amino groups, which may be used in the form of aqueous solutions, but not including the proportion of water used for dispersing the polyurethanes, which water may continue to react in a chain lengthening reaction with any compounds present which contain isocyanate groups. Any sulfonic acid groups or carboxylic groups present as component (b) in the reaction mixture are not regarded as isocyanate reactive groups in the context of this invention. This is justified on the basis of the slow reaction velocity of these groups with isocyanate groups.

Both the one-shot process and the two-stage prepolymer process may be carried out in the presence or absence of solvents. Suitable solvents, particularly if the polyurethanes are to be converted into an aqueous dispersion after their preparation, as mentioned below, include, for example, water-miscible solvents which are inert towards isocyanate groups and have a boiling point below 100° C., e.g. acetone or methyl ethyl ketone.

In the one-shot process, the difunctional compounds containing isocyanate reactive end groups and having molecular weights of from 300 to 6000 mentioned under 1 to 7 above are preferably mixed with the hydrophilic chain lengthening agents (a) and (b) and, if used, the chain lengthening agents with a molecular weight below 300. The diisocyanate component is then added solvent-free to the resulting mixture, optionally together with hydrophilic diisocyanate (a) and/or (b), and the resulting mixture is then reacted at temperatures from 50 to 150° C., optionally after addition of catalysts commonly used in polyurethane chemistry. The quantity of diisocyanate components added is chosen so that the reaction mixture contains an NCO/OH ratio of 0.8 to 1.05. If hydrophilic diisocyanate (a) and/or (b) are used, the hydrophilic chain lengthening agents may, of course, be dispensed with although hydrophilic chain lengthening agents are preferred to hydrophilic diisocyanate. The viscosity of the reaction mixture rises during the reaction. One of the above mentioned solvents is therefore gradually added to the mixture. An organic solution of the completely reacted polyurethane is finally obtained. Its concentration is preferably adjusted to a solids content of from 10 to 70% by weight, in particular from 15 to 55% by weight. If the one-shot process is employed, it is particularly recommended to use dihydroxysulphonates, dihydroxysulfonic acids or tertiary amines with two alcoholic hydroxyl groups as component (b). If the compounds used as component (b) contain groups which can be converted into ionic groups, it is recommended to carry out this conversion by neutralization or quaternization in known manner after the polyaddition reaction, either in an organic solution or in such a manner that the polyurethane present in organic solution is neutralized by the water present in the neutralizing agent during its conversion into an aqueous dispersion.

Conversion of the dissolved polyurethane elastomers into an aqueous dispersion is then suitably carried out by the addition of water to the stirred solution. The system then in many cases passes through the phase of a water-in-oil emulsion and then changes into an oil-in-water emulsion as it overcomes a viscosity maximum. A pure, aqueous, stable dispersion is left behind after removal of the solvent by distillation.

When the two-stage process is employed, an isocyanate prepolymer is preferably first prepared in the melt from excess diisocyanate, a higher molecular weight compound with isocyanate reactive groups, such as the compounds mentioned as examples under 1 to 7 above, and hydrophilic chain lengthening agents (a) and optionally (b) under conditions maintaining an NCO/OH ratio of from 1.1:1 to 3.5:1, preferably from 1.2:1 to 2.5:1, either in the absence of solvents or already in the presence of solvents, this isocyanate prepolymer being then taken up, for example, in a suitable solvent, if no solvent has so far been used. The same comments made above with regard to the possibility of dispensing with hydrophilic chain lengthening agents and using hydrophilic diisocyanates instead also apply here. The resulting solution of prepolymer may be reacted in known manner with the chain lengthening agent having a molecular weight below 300, examples of which have been given above. For preparing the polyurethane dispersions according to the invention, it is recommended to use a special variation of the two-stage process in which a solution of the chain lengthening agent (the above mentioned diamines or hydrazine derivatives are preferably used as chain lengthening agents in this case) in a small quantity of water or of a water/solvent mixture is added to the above described solution of isocyanate prepolymer in such proportions that the NCO/NH ratio obtained is between 2.5 and 1.05. This reaction may be carried out at room temperature or preferably at temperatures from 25° to 60° C. The polyurethane dispersion is finally obtained by subsequently adding the remaining water and removing the solvent. In this variation of the process, the chain lengthening agent may also be dissolved in the total quantity of water finally present in the dispersion (from 50 to 200% by weight, based on the solid polyurethane substance). When the two-stage process is employed, it is quite possible and in many cases even preferred not to build component b) into the prepolymer. Instead, aqueous solutions of diaminocarboxylates or diaminosulfonates may be used instead of or in combination with the above mentioned diamines or hydrazine derivatives in the chain lengthening reaction described above, for example in accordance with the method given in Example 3.

However, the two-stage process described may easily be carried out solvent-free by preparing the above described isocyanate propolymer solvent-free and stirring it into the water as a melt, and in this case the ionic or non-ionic chain lengthening agents mentioned above which contain amino groups may also be present in the form of solutions in water.

The dispersions or solutions according to the invention preferably have a predominantly linear molecular structure and, in addition to the electrolyte content mentioned below, they are characterized by an ethylene oxide content, built into a polyether chain, of from 1.2 to 50% by weight, preferably from 5 to 20% by weight, based on the polyurethane solid content, and by a content of ionic groups, preferably of =N=,

—COO⁻,

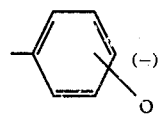

or SO$_3^{(-)}$ groups of from 5 to 250 milliequivalents, preferably from 10 to 50 milliequivalents per 100 g of polyurethane solid content. The polyalkylene oxide side chain which contains the ethylene oxide units which are essential to the invention is preferably attached through groups (i) of the formula

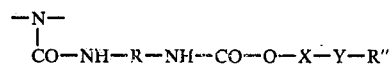

or (ii) of the formula

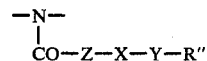

in which

R, R″, X, Y and Z have the meanings already specified.

The process described above only represents a preferred but not the only method of obtaining these polyurethanes. Another method of obtaining suitable hydrophilic polyurethanes, for example consists of introducing the nonionic hydrophilic groups which are in side positions or end positions into a polyurethane elastomer which already contains ionic groups or groups capable of conversion into ionic groups, preferably a linear polyurethane elastomer, by reacting this elastomer with hydrophilic monoisocyanates of the formula

in which

R, X, Y and R″ have the meanings already specified.

The preparation of such hydrophilic monoisocyanates and of the corresponding monohydroxypolyethers HO—X—Y—R″ which are also suitable as hydrophilic reaction components according to the invention is carried out by a process analogous to that described in U.S. Pat. No. 3,905,929. Instead of the monofunctional polyether alcohols mentioned in the said patent, one could in the present case also use polyether alcohols in which the polyether segments contain not only ethylene oxide units but also up to 60% by weight, preferably up to 35% by weight, based on the polyether segment, of propylene oxide, butylene oxide or styrene oxide units, preferably propylene oxide units.

In cases where these hydrophilic monoisocyanates are used for preparing the polyurethanes, it is preferable to prepare, from the above mentioned starting materials, a linear polyurethane which contains ionic groups or groups capable of conversion into ionic groups but no hydrophilic polyether segments, using an equivalent ratio of isocyanate groups to isocyanate reactive groups preferably amounting to 1:1. This linear polyurethane elastomer is then reacted with the hydrophilic monoisocyanate in the melt or in a suitable solvent, for example of the type mentioned above, at temperatures from 50° to 150° C., the main reaction taking place under these conditions being an addition of the isocyanate group of the hydrophilic monoisocyanate to the active hydrogen atoms of the urethane and/or urea groups present in the linear polyurethane. Any groups present which are capable of conversion into ionic groups are subsequently converted at least partly into the corresponding ionic group by known neutralization or quaternization reactions. If the starting materials used in this embodiment of the preparation of the polyurethanes according to the invention include compounds containing carboxyl groups which are subsequently to be converted into carboxylate groups by neutralization, care must be taken to use only those carboxyl compounds in which the carboxyl groups are less reactive towards isocyanate groups than urethane or urea groups are.

It is also particularly preferred to employ a method in which a prepolymer containing isocyanate end groups and ionic groups or groups capable of conversion into ionic groups is reacted with a monofunctional hydrophilic polyether represented by the formula HO—X—Y—R″ to form a polymeric polyurethane containing hydrophilic polyether segments in end positions. Such a product could, of course, also be obtained by a one-shot process if a suitable hydrophilic monofunctional polyether is used as component for the synthesis of the polyurethane. Lastly, a prepolymer containing ionic groups or groups capable of conversion into ionic groups and containing OH, SH, NH$_2$, NHR or COOH end groups could be reacted with a hydrophilic monoisocyanate represented by the formula

OCN—R—NH—CO—O—X—Y—R″ in which R, X, Y and R″ have the meanings already indicated.

This group of polyurethanes according to the invention is characterized by the grouping

—U—R—NH—CO—O—X—Y—R″ in which
U represents O—CO—NH, NH—CO—NH, NH—CO or S—CO—NH and R, X, Y, R″ have the meaning indicated above.

When preparing polyurethanes having monofunctional hydrophilic polyethers in end positions, it is preferable to ensure at least slight branching of these products, for example by using a proportion of trifunctional or polyfunctional starting components or by partial allophanatization, trimerization or biuretization.

The resulting polyurethane, obtained in the form of a melt or as solution, can be converted into an aqueous dispersion by mixing it with water which may contain electrolytes and a neutralizing agent for any potential ionic groups present, and, if necessary, subsequently distilling off the auxiliary solvent.

The polyurethanes could in principle be converted into aqueous dispersions or solutions by any desired process. As examples may be mentioned here: dispersion without the use of solvents, e.g. by mixing the polyurethane melt with water in apparatus capable of producing high shearing forces; the use of very small quantities of solvents for plasticizing the mixture, using the same apparatus; the use of non-mechanical dispersing agents such as extremely high frequency sound waves, and the like. Lastly, chain lengthening after conversion of the prepolymer into an aqueous emulsion can also be carried out on polyurethane ureas. Simple mixers such as stirrer vessels or so-called throughflow mixers may be used since the polyurethanes according to the invention are self-dispersible.

The polyurethane dispersions or solutions according to the invention generally contain from 5 to 60% by weight, preferably from 10 to 50% by weight, of dispersed or dissolved polyurethane.

The term "water-soluble electrolyte" is used in the context of this invention to include the following:
(1) Salts of strong inorganic and organic acids with inorganic or organic bases;
(2) salts of strong inorganic and organic bases with inorganic or organic acids;
(3) strong inorganic and organic acids;
(4) strong inorganic and organic bases.

The term "strong acid" denotes an acid with a pka-value of from /0 to 3 ; The term "strong base" denotes a base with a pkb-value of from 0 to 3.

The following are examples of salts of Group 1: Sodium chloride, sodium sulfate, potassium hydrogen phosphate, potassium bromide, sodium chlorate, sodium perchlorate, trisodium phosphate, sodium trichloroacetate, sodium benzene sulfonate, sodium methane sulfate, ammonium chloride, ammonium sulfate, calcium chloride, magnesium chloride, aluminum sulfate, potassium aluminum sulfate, zinc chloride, barium chloride, and salts of primary, secondary or tertiary amines, for example with hydrochloric acid, hydrobromic acid, sulfuric acid, phosphoric acid or organic sulfonic acids.

The following are examples of salts of Group 2: Sodium phosphite, potassium carbonate, sodium borate, sodium formate, calcium formate, potassium acetate, potassium lactate, potassium adipate, disodium adipate, sodium tartrate, potassium benzoate, sodium silicate, potassium silicate.

The following are examples of acids of Group 3: Hydrochloric acid, hydrobromic acid, sulfuric acid, nitric acid, phosphoric acid, perchloric acid, trichloroacetic acid, trifluoroacetic acid, methane sulfonic acid, ethane sulfonic acid, benzene sulfonic and p-toluene sulfonic acid.

The following are examples of bases of Group 4: Sodium hydroxide, potassium hydroxide, calcium hydroxide, barium hydroxide, guanidine, tetramethyl ammonium hydroxide.

Particularly preferred according to the invention are salts of acids of Group 3 with bases of Group 4.

Organic compounds used as acid or basis components should not form mycellae in their salt form and should not have surface active properties. Hydrocarbon groups should therefore generally not have more than eight carbon atoms.

It is immaterial in principle by what method the electrolyte is introduced into the dispersion. It may be added in solid form during preparation of the polyurethane or it may be dissolved in the water of dispersion. Alternatively, it may be added to the finished dispersion. Lastly, the electrolyte salt may be produced in the dispersion by in situ neutralization of the components.

Regardless of the method employed for adding the electrolyte, the quantity used is calculated so that the solutions or dispersions according to the invention contain from 0.5 to 100% by weight, preferably from 1 to 20% weight, based on the polyurethane solid content, of electrolyte dissolved in water. The quantity of electrolyte is most preferably from 2 to 20% by weight. Based on water the quantity of electrolyte is preferably from 0,8 to 20%, and most preferably from 2 to 15% by weight.

The electrolyte-containing polyurethane dispersions according to the present invention have numerous advantageous properties compared with previously known dispersions. They are less sensitive to frost and completely stable to additives containing electrolytes, e.g. to pigments and fillers. For example, they can be mixed with suspensions of partially soluble mineral binders such as cement lime or gypsum. They are also compatible with solutions of alkali metal silicates, thereby providing the possibility of preparing inorganic-organic liquid binders. They are particularly suitable as additives in cloth printing and in the paper industry, e.g. for sizing paper. Coatings prepared from the dispersions according to the invention are distinguished by their reduced swelling in water and by a marked antielectrostatic effect. They can also be used for preparing coatings having a certain electric conductivity. The dispersions are thermosensitive. On heating, the dissolved electrolyte causes complete coagulation.

EXAMPLE 1

This example shows that dispersions containing mixtures of cationic and non-ionic-hydrophilic units of the kind which can be prepared according to the known art are not stable in the presence of electrolytes whereas a corresponding dispersion prepared according to the invention, which contains the same quantities of cationic and non-ionic-hydrophilic segments, is stable for weeks in the presence of the same quantities of electrolyte.

A. Preparation of a cationic polyurethane dispersion (Comparison Example according to U.S. Pat. No. 3,480,592)

65 Parts by weight of a polyester diol (of adipic acid, phthalic acid and ethylene glycol, hydroxyl number 67), and 222 parts by weight of a polyester diol (of phthalic acid anhydride and ethylene glycol, hydroxyl number 56), are together dehydrated at 120° C. and 15 Torr for 30 minutes. 49 Parts by weight of hexane-1,6-diisocyanate are added at 80° C. and the mixture is stirred without heating for 10 minutes. It is then left to react for a further 110 minutes at 110° to 120° C. The isocyanate content is determined by reaction with n-dibutylamine and back titration with hydrochloric acid (3.42% by weight of isocyanate). The mixture is then left to cool to 80° C. and diluted portionwise without further heating with a total of 80 parts by weight of acetone, the solution being left to cool to 60° C. at this stage. 8.6 Parts by weight of N-methyl-diethanolamine are added at this temperature and the mixture is stirred for 30 minutes and diluted with a further 80 parts by weight of acetone. 9 Parts by weight of 1-aminomethyl-5-amino-1,3,3-trimethylcyclohexane (this quantity is calculated from the isocyanate content found in the prepolymer) and 0.6 parts by weight of hydrazine monohydrate are added and stirring is continued for a further 30 minutes. 6.4 Parts by weight of chloroacetamide are then added and stirring is continued at 60° C. until no isocyanate band can be seen in the IR spectrum of the acetonic solution. 8 Parts by weight of orthophosphoric acid (85%) are added and the mixture is slowly dispersed (in about 20 minutes) with 844 parts by weight of distilled water which has been preheated to 50°. The acetone is then removed in a water jet vacuum at a bath temperature of 50°. A finely divided cationic polyurethane dispersion having a solid content of 32.5% by weight and a pH of 3.9 and containing 20 milliequivalents of quaternary nitrogen per 100 g of polyurethane is obtained. A sample of this dispersion adjusted to a solid content of 10% is maintained at 85° C. for 24 hours. It shows no signs of sedimentation at the end of this time. Particles size determinations (by light scattering) carried out before and after the temperature show identical values.

When 1 ml of a 10% aqueous sodium chloride solution is added to 50 ml of this sample, immediate coagulation occurs.

B. Preparation of a non-ionic-hydrophilic polyurethane dispersion (Comparison example according to U.S. Application Ser. No. 746,919) now U.S. Pat. No. 4,190,566.

An aqueous polyurethane dispersion is prepared from the following starting materials by the process described in Example 1A:

65 Parts by weight of a polyesterdiol of adipic acid, phthalic acid anhydride and ethylene glycol, hydroxyl number 67;

222 parts by weight of a polyester diol of phthalic acid anhydride and ethylene glycol, hydroxyl number 56;

54 parts by weight of a polyether diol having an average molecular weight of 2140, prepared from equimolar parts of (i) a polyether monohydric alcohol of n-butanol, ethylene oxide and propylene oxide (molar ratio of ethylene oxide to proplene oxide 83:17), OH number 30, (ii) hexane-1,6-diisocyanate and (III) diethanolamine;

40.6 parts by weight of hexane-1,6-diisocyanate, 3,8 parts by weight of 1-aminomethyl-5-amino-1,3,3-trimethylcyclohexane;

0.6 parts by weight of hydrazine monohydrate;

900 parts by weight of water.

A finely divided polyurethane dispersion is obtained. When adjusted to pH 4 with 20% phosphoric acid, it is found to have a solid content of 29% and to contain 20 "pseudomilliequivalents" of built-in ethylene oxide units (10.3% by weight of ethylene oxide) per 100 g of polyurethane.

When 100 ml of a 10% aqueous sodium chloride solution are added, 50 ml of this dispersion which has been adjusted to a solid content of 10% remain completely stable and the particle size does not change. When heated to 85° C., on the other hand, the dispersion coagulates instantly.

C. Mixtures of cationic dispersion A with non-ionic-hydrophilic dispersion B (Attempt to combine the properties of the dispersions prepared according to the known art)

Samples of dispersion A and B were first adjusted to a solid content of 10% by weight. Then 1. 50 ml of dispersion A and 50 ml of dispersion B were mixed. This resulted in a dispersion which was stable at room temperature[(1)]. To 50 ml of this mixture were added 1 ml of 10% sodium chloride solution. Coagulation occured instantly. The other 50 ml were heated to 85° C. and here again, the polyurethane irreversibly coagulated. The experiment was repeated, using a mixture of dispersions A and B in proportions by weight of A:B as 4:1[(2)]. The results with regard to compatibility with electrolytes and thermostability were just as negative as the 1:1 mixture. These experiments show that cationic dispersions containing electrolyte cannot be prepared by mixing dispersions which have been prepared according to the known art.

[(1)] This 1:1 dispersion mixture contains, based on 100 g of PU solid, about 10 milliequivalents of $N^{\oplus}$ and about 10 "pseudomilliequivalents" of ethylene oxide units.
[(2)] This 4:1 dispersion mixture contains, based on 100 g of PU solid, about 16 milliequivalents of $N^{\oplus}$ and about 4 "pseudomilliequivalents" of ethylene oxide units.

D. Preparation of a cationic dispersion containing electrolyte according to the invention (Milliequivalents $N^{\oplus}$:pseudomilliequivalents $(CH_2)_2O = 1:1$)

An aqueous polyurethane dispersion is prepared from the following starting materials by the method described in Example 1A:

65 Parts by weight of a polyester diol of adipic acid, phthalic acid anhydride and ethylene glycol, OH number 67;
222 parts by weight of the polyetherdiol according to Example 1 B;
44.7 parts by weight of hexane-1,6-diisocyanate;
4.3 parts by weight of N-methyl-diethanolamine;
9.5 parts by weight of 1-aminomethyl-5-amino-1,3,3-trimethylcyclohexane;
0.6 parts by weight of hydrazine monohydrate;
3.0 parts by weight of chloroacetamide
4 parts by weight of o-phosphoric acid (85%);
900 parts by weight of water The finely divided polyurethane dispersion obtained has a solid content of 31% and a pH of 3.1 and in addition to 10 milliequivalent of quaternary nitrogen it contains an equal number of "pseudomilliequivalents" of ethylene oxide units.

This corresponds in its overall composition, based on the solid content, to the 1:1 mixture of A and B as described in C. A 50 ml sample adjusted to a solid content of 10% was stable for several weeks after the addition of 1 ml of a 10% sodium chloride solution, E. Preparation of a cationic dispersion containing electrolytes according to the invention (Milliequivalents $N^{\oplus}$:pseudomilliequivalents $(CH_2)_2O = 4:1$)

To show that stable dispersions containing electrolyte can also be prepared with smaller proportions of non-ionic-hydrophilic components, an aqueous polyurethane dispersion is prepared from the following starting materials by the method described in Example 1 A:

65 Parts by weight of a polyester of adipic acid, phthalic acid anhydride and ethylene glycol, hydroxyl number 67;
222 parts by weight of a polyester diol of phthalic acid anhydride and ethylene glycol, hydroxyl number 56;
10.8 parts by weight of a polyether diol according to Example 1 B;
47 parts by weight of hexane-1,6-diisocyanate;
6.8 parts by weight of N-methyl-diethanolamine;
9.6 parts by weight of 1-aminomethyl-5-amino-1,3,3-trimethylhexane;
0.6 parts by weights of hydrazine monohydrate;
4.9 parts by weight of chloroacetamide;
8 parts by weight of o-phosphoric acid (85%);
850 parts by weight of water.

The resulting finely divided polyurethane dispersion has a solid content of 32% and a pH of 3.5 and contains, per 100 g of polyurethane, 16 milliequivalents of quaternary nitrogen and 4 "pseudomilliequivalents" of ethylene oxide units. A completely stable polyurethane dispersion containing electrolytes is obtained after the addition of 2% by weight of sodium chloride, based on the polyurethane solids content. This dispersion corresponds in its gross composition to the 4:1 mixture of A and B described under C.

EXAMPLE 2

340 Parts by weight of a polyester diol (of hexane-1,6-diol, 2,2-dimethylpropane-1,3-diol and adipic acid, OH number 65), and 21.5 parts by weight of a polyether monohydric alcohol of n-butanol, ethylene oxide and propylene oxide (molar ratio of ethylene oxide to propylene oxide 83:17), hydroxyl number 26, are dehydrated together at 120° C. and 15 Torr for 30 minutes. 67.2 Parts by weight of hexane-1,6-diisocyanate are added at 80° C. and the mixture is stirred at 110° C. for 120 minutes. The prepolymer is cooled to 60° C. and slowly diluted with 160 parts by weight of acetone, starting at 80° C. 11.9 Parts by weight of N-methyl-diethanolamine are added at 60° C. and the mixture is stirred for 30 minutes and then diluted with a further 160 parts by weight of acetone. 10.5 Parts by weight of 1-aminomethyl-5-amino-1,3,3-trimethylcyclohexane are then added, followed by 3 parts by weight of hydrazine monohydrate. The reaction mixture is stirred for 30 minutes at 60° C. and diluted with a further 110 parts by weight of acetone. 8.4 parts by weight of chloroacetamide are than added and the mixture is left to react for one hour. Formation of the ammonium salt is completed by the addition of 11 parts by weight of phosphoric acid. 1100 Parts by weight of water which has been preheated to 50° C. is slowly run in and the acetone is distilled off under vacuum at an external temperature of 50° C. 100 Parts by weight of a 10% sodium chloride solution are stirred in at room temperature. The resulting finely divided cationic polyurethane dispersion which contains electrolyte and is stable in storage has a solid content of 30% by weight and a pH of 4.3 and, based on 100 g of polyurethane, it contains 21 milliequivalents of quaternary nitrogen and 18 "pseudomilliequivalents" of ethylene oxide units (corresponding to 3.6% by weight) in addition to 2% of sodium chloride.

It could be demonstrated by a comparison experiment that a similar dispersion containing electrolyte could not be prepared without the hydrophilic polyether. Although preparation of the dispersion progresses in a completely analogous manner up to the point of addition of the sodium chloride solution, the dispersion thereafter coagulates instantly.

EXAMPLE 3

209 Parts by weight of a hexanediol-neopentyl glycolpolyadipate (average molecular weight 1670) and 10.7 parts by weight of a polyether monohydric alcohol according to Example 2 are dehydrated in a water jet vacuum at 120° C. with stirring for 30 minutes. The dehydrated reaction mixture is left to cool to 70° C., and 39 parts by weight of hexane-1,6-diisocyanate are added. When the exothermic reaction has died down, the reaction mixture is stirred for 2 hours at 120° C. 700 ml of acetone are added when the reaction mixture has cooled to 70° C., and the bath temperature is then adjusted to 60° C. to maintain the reaction mixture at a temperature of 55° C.

An extender solution is prepared from 13.75 parts by weight of an aqueous solution of N-(2-aminoethyl)-2-aminoethane sulfonic acid sodium (43% by weight solid content), 1.90 parts by weight of ethylene diamine and 58 parts by weight of water, and this extender solution is added to the reaction mixture which has been maintained at 55° C. The resulting mixture is stirred for 5 minutes, 270 ml of water are then added, and the acetone is then distilled off in a water jet vacuum. 13.5 g of sodium chloride are stirred in when the reaction mixture is cold. The resulting finely divided anionic polyurethane dispersion containing electrolyte has an organic solid content of 40% by weight and, based on the polyurethane solid content, it contains 0.96% by weight of $SO_3^{\ominus}$ groups (=12 milliequiv./100 g), 3.2% by weight of ethylene oxide units and 5% by weight of sodium chloride, and it has an average particle diameter of between 150 and 200 nm (determined by light scattering). The dispersion is virtually indefinitely stable at room temperature.

EXAMPLE 4

An aqueous polyurethane dispersion is prepared from the following starting materials by the method described in Example 2:

262 Parts by weight of a polycarbonate diol based on hexane-1,6-diol and tetraethylene glycol (molar ratio 2:5), hydroxyl number 81;
123 parts by weight of hexane-1,6-diisocyanate;
50 parts by weight of N-methyl-diethanolamine;
50 parts by weight of dimethylsulfate;
2000 parts by weight of water;
10 parts by weight of 37% formalin:

The dispersion is adjusted to a solid content of 20% by weight. 50 Parts by weight of 10% sodium chloride solution are then added. The resulting finely divided cationic polyurethane dispersion containing electrolyte is stable in storage and can be kept at room temperature for weeks without sedimentation.

EXAMPLE 5

A cationic polyurethane dispersion is prepared from the following components by the method described in Example 2:

21200 Parts by weight of a polyester diol of adipic acid, phthalic acid anhydride and ethylene glycol, hydroxyl number 63.4;
1350 parts by weight of a polyether diol according to Example 1 B;
3380 parts by weight of hexane-1,6-diisocyanate;
500 parts by weight of N-methyl-diethanolamine;
280 parts by weight of 1,2-diaminopropane;
0.8 parts by weight of phosphoric acid
38000 parts by weight of water
15 parts by weight of 37% formalin A polyurethane dispersion having a solid content of 41.5% by weight is obtained. This dispersion is diluted with water to a solid content of 10%. The dispersion has a quaternary nitrogen content of 0.21% by weight (based on the polyurethane solid content), a pH of 4.7 and an average particle diameter (measured by light scattering) of 152 to 159 nm.

Two experiments are carried out using this product:

(a) 3 Parts by weight of 20% phosphoric acid are added to 50 parts by weight of the dispersion, the pH of the dispersion being thereby lowered to 2.1. 5 Parts by weight of a 10% aqueous potassium hydroxide solution are then added with stirring, the pH being thereby raised to 7.1. The resulting finely divided dispersion which is stable in storage at room temperature contains 20% of potassium phosphate, based on the PU solid content.

(b) 10 Parts by weight of a 10% aqueous magnesium chloride solution are added to 100 parts by weight of a 10% dispersion. The resulting electrolyte-containing cationic dispersion is stable in storage at room temperature for several weeks without undergoing sedimentation.

EXAMPLE 6

250 Parts by weight of polypropylene ether glycol (hydroxyl number 56) and 42.5 parts by weight of the hydrophilic polyether from Example 2 are dehydrated at 130° C. for 30 minutes and reacted with 119 parts by weight of tolylene diisocyanate (isomer content 65:35) at 80° C. for 2 hours. 61 g of thiodiglycol in 120 parts by weight of acetone are added at 50° C., followed by 0.05 parts by weight of dibutyl tin dilaurate, and the mixture is stirred for 90 minutes at 50° C. 160 Parts by weight of acetone are added and the mixture is again stirred at 50° C. for 90 minutes. It is then diluted with 365 parts by weight of acetone. A 50% solution of polyurethane in acetone is obtained which on cooling solidified thermoreversibly to a gelatinous mass.

300 Parts by weight of the polyurethane solution are heated with 19.5 parts by weight of dimethylsulphate to 60° C. for 4 hours and then stirred up with 10.2 parts by weight of 85% phosphoric acid for 10 minutes. 600 Parts by weight of water are then added dropwise. The acetone is distilled off and, after cooling to room temperature, 30 ml of a 10% aqueous magnesium chloride solution are added. A finely divided cationic polyurethane dispersion containing electrolyte is obtained. The dispersion is stable at room temperature, contains 2% of magnesium chloride, based on the polyurethane solids content, and has a pH of 1.9 and a solid content of 20% by weight.

What is claimed is:

1. Aqueous dispersions or solutions of polyurethane ionomers which are stable at room temperature, characterized by
   (a) hydrophilic polyalkylene oxide-polyether chains in the polyurethane, having an ethylene oxide unit content of from 1.2 to 50% by weight, based on the polyurethane solid content;
   (b) containing 5 to 250 milliequivalents, per 100 g of polyurethane solid content, of ionic groups built into the polyurethane; and
   (c) containing from 0.5 to 100% by weight, based on the polyurethane solid content, of water-soluble electrolytes dissolved in the water, wherein said water-soluble electrolytes are salts of
  (i) inorganic or organic acids having a pKa-value of from 0 to 3 with
  (ii) inorganic or organic bases having a pKb-value of from 0 to 3 with the proviso that where organic compounds are used as said organic acids or said organic bases, they should not form mycellae in their salt form, should not have surface active properties and should not contain hydrocarbon groups with more than eight carbon atoms.

2. The composition of claim 1 having a polyurethane solid content of from 5 to 60% by weight.

3. The process for the preparation of stable aqueous polyurethane dispersions containing watersoluble electrolytes by the reaction of organic diisocyanates with organic compounds having a molecular weight in the range of from 300 to 6000 which are difunctional in the isocyanate polyaddition reaction and contain isocyanate reactive hydrogen atoms in end positions, with the addition of reaction components containing hydrophilic groups or groups capable of conversion into such hydrophilic groups for the purpose of ensuring the dispersibility of the polyurethanes, the at least partial conversion of the last mentioned groups into hydrophilic groups taking place during or after the polyaddition reaction, and optionally with the addition of chain lengthening agents with a molecular weight below 300 which are known per se in polyurethane chemistry, and optionally with the addition of the usual auxiliary agents and additives used in polyurethane chemistry, solution or dispersion of the polyurethane in water being carried out during or after synthesis of the polyurethane, characterized in that the starting components used which contain hydrophilic groups or groups capable of conversion into hydrophilic groups include both (a) mono- or diisocyanates and/or compounds which are monofunctional or difunctional in the isocyanate polyaddition reaction and contain isocyanate reactive hydrogen atoms and said isocyanates and said compounds contain hydrophilic side chains or end chains containing ethylene oxide units and (b) mono- or diisocyanates and/or compounds which have isocyanate reactive groups and are monofunctional or difunctional in the isocyanate polyaddition reaction, which isocyanates and which compounds contain ionic groups or groups capable of conversion into ionic groups, the nature and quantity or degree of neutralization or quaternization of components (a) and (b) being selected so that the polyurethane finally obtained contains from 1.2 to 50% by weight of built-in ethylene oxide units and from 5 to 250 milliequivalents of ionic groups per 100 g; and, from 0.5 to 100 parts by weight, based on the dissolved or dispersed polyurethane, of water-soluble electrolytes being added to the aqueous phase before, during or after solution or dispersion of the polyurethane, wherein said water-soluble electrolytes are salts of (i) inorganic or organic acids having a pKa-value of from 0 to 3 with
  (ii) inorganic or organic bases having a pKb-value of from 0 to 3 with the proviso that where organic compounds are used as said organic acids or said organic bases, they should not form mycellae in their salt form, should not have surface active properties and should not contain hydrocarbon groups with more than eight carbon atoms.

* * * * *